United States Patent [19]
Windhorn

[11] Patent Number: 5,880,537
[45] Date of Patent: Mar. 9, 1999

[54] UNINTERRUPTABLE POWER SUPPLY

[75] Inventor: Allen E. Windhorn, Kasota, Minn.

[73] Assignee: Caterpillar Inc., Peoria, Ill.

[21] Appl. No.: 781,757

[22] Filed: Jan. 10, 1997

[51] Int. Cl.$^6$ ........................................... H02J 9/08
[52] U.S. Cl. ................. 307/64; 307/66; 307/68; 307/67; 320/127; 322/11; 322/29; 318/107
[58] Field of Search ................. 307/64, 66, 68, 307/67, 45, 46, 47; 320/2; 322/10, 11, 29; 318/107

[56] References Cited

U.S. PATENT DOCUMENTS

| | | |
|---|---|---|
| 3,243,598 | 3/1966 | Grillo . |
| 3,514,625 | 5/1970 | Lane . |
| 3,594,586 | 7/1971 | Toesca ................................ 307/66 |
| 3,665,495 | 5/1972 | Carter et al. . |
| 4,131,827 | 12/1978 | Larrabee ........................... 307/64 |
| 4,203,041 | 5/1980 | Sachs . |
| 4,262,212 | 4/1981 | Jacob et al. . |
| 4,406,950 | 9/1983 | Roesel, Jr. . |
| 4,460,834 | 7/1984 | Gottfried . |
| 4,465,943 | 8/1984 | Risberg . |
| 4,471,233 | 9/1984 | Roberts ............................. 307/66 |
| 4,517,471 | 5/1985 | Sachs . |
| 4,645,940 | 2/1987 | Wertheim . |
| 4,665,322 | 5/1987 | Eishima et al. . |
| 4,827,152 | 5/1989 | Farkas . |
| 5,053,635 | 10/1991 | West ................................. 307/66 |
| 5,081,368 | 1/1992 | West . |
| 5,105,096 | 4/1992 | Waldschmidt et al. . |
| 5,194,757 | 3/1993 | Wertheim . |
| 5,198,698 | 3/1993 | Paul et al. ......................... 307/64 |
| 5,268,850 | 12/1993 | Skoglund . |

OTHER PUBLICATIONS

Muljadi, E.; "Power Factor Enhancement of Induction of Induction Machines By Means of Solid State Excitation"; Oct. 4, 1989; *IEEE Transactions on Power Electronics* vol. 4, No. 4; pp. 409–418.

Sachs, K.; "A Low–Impedance Uninterruptible Power Technology for Nonlinear Critical Loads"; Sep./Oct. 1987; *IEEE Transactions On Industrial Applications* vol. IA–23, No. 5; pp. 796–803.

*Primary Examiner*—Jeffrey A. Gaffin
*Assistant Examiner*—Albert W. Paladini
*Attorney, Agent, or Firm*—William R. Walbrun

[57] ABSTRACT

An uninterruptable power supply, operating normally under power supplied by a utility, has a main motor, a smaller induction motor, and a mechanical load such as a generator coaxially coupled together. A battery is connected to the smaller induction motor through an inverter. The induction motor is normally idled at a frequency lower than that of the utility, and therefore operates as an induction generator which is used to charge the battery through the inverter. Upon utility failure, the utility line is disconnected and the induction motor is powered by the battery through the inverter. The frequency of the inverter may be increased to maintain the rotational speed of the system at a nearly constant level.

17 Claims, 1 Drawing Sheet

UNINTERRUPTABLE POWER SUPPLY

BACKGROUND OF THE INVENTION

The present invention relates generally to uninterruptable power supplies. Specifically it relates to a hybrid rotary-static uninterruptable power supply.

Machinery, computers, and the like used in all areas of business and personal use require reliable power in order to operate effectively under all conditions. When machinery or computers are used to perform tasks that are critical to ongoing work, the public utility power source may not be sufficient. If the utility power source fails, important operations may not be performed, or important or sensitive computer data may be lost. To cope with such power source failure, uninterruptable power systems (also known as UPS systems) are used to provide power. These systems vary widely in structure and operation.

One type of known UPS system is a rotary UPS system having an AC motor generator set and an auxiliary DC motor mechanically coupled to the shaft of the motor generator set. This auxiliary DC motor may be used as a DC generator to charge the backup battery bank during the normal utility powered operation. When a power outage is detected, DC power from the battery bank is connected to the auxiliary DC motor to turn the shaft of the AC motor generator set. Such UPS systems require frequent maintenance. For example, the commutator on the auxiliary DC motor has a limited lifetime. Carbon dust from the brushes of the auxiliary motor can cause shorting problems for sensitive electronic equipment located in the area of the UPS system. Further, when the UPS system switches from utility powered operation to battery powered operation, speed regulation is poor due to the slow response time of the auxiliary DC motor. If the load is changed, the slow response results in significant frequency shifts. The auxiliary DC motor is heavy, and a firm base and extra space is required for coupling it to the motor generator set. Accordingly, the rotary UPS system will be dimensionally longer and heavier than other motor generator sets.

A second type of UPS system is a hybrid UPS system. Three variations of hybrid UPS systems are available.

An off-line hybrid UPS system powers the AC motor of a standard motor generator set from the utility power during normal operation. When a utility power failure is detected, an inverter powers the AC motor of the motor generator set. The inverter is normally inactive, and is switched on at or near the moment of utility failure. During normal utility powered operation, off-line systems have low stress on their semiconductor components. However, when the utility fails, maximum semiconductor stress is incurred. This moment of utility failure is the most critical instant for a UPS system, and if the inverter fails, it is most likely to fail at this time. The probability of failure is increased since the conditions immediately prior to a utility power outage are often unusual and unpredictable and may include power surges, asymmetrical transients, or reverse power flow. Because of line conditions at switchover after utility failure, a large transient often occurs. Such a transient can overload or disable the inverter. Since the inverter is normally off-line and inactive until absolutely needed, there is no way to be certain in advance whether the inverter will be able to be successfully activated and ready to assume the load upon utility failure. Further, from the time of detection of utility failure to the response of switching on the inverter, output frequency to the load is continuously declining.

A second hybrid UPS system is known as an on-line system. An on-line system has a utility powered inverter assembly which is active continuously even during normal utility powered operation. The inverter continuously drives the AC motor of a standard motor generator set. At the time of utility failure, no additional stress is placed on the on-line system, since the inverter's power may be drawn from a battery instead of from the utility, and the inverter is already running. Problems with this on-line hybrid UPS system are that inverter losses are incurred in addition to losses from the motor generator set, degrading system efficiency. Also, the rectifier portion of the inverter assembly, which charges the batteries, is continuously exposed to line transients, and contributes to line current distortion. The inverter must handle all line conditions when it runs continuously in this fashion. Line transients and line current distortion can cause overloads of the inverter as well as affect the quality of the power supplied. Also, when the inverter is run continuously from the utility, the inverter generates undesirable harmonics back into the line.

A third type of hybrid UPS system is a parallel processing system. In this system, an inverter is idled in parallel with the utility. When a utility failure occurs, the utility is disconnected and the AC motor of the motor generator set is run from the inverter. This system has efficiency comparable to a solitary motor generator set. However, this system must use pulse width modulation in order to avoid excessive current harmonics. As in an online system, the inverter is continuously exposed to line transients. In order to protect the inverter, especially during faults and failures, additional protection and filtering are required.

It would be desirable to provide a UPS system which has the advantages of being isolated from line transients, having a quick response time between utility failure and switchover, and having frequency maintenance upon utility failure, efficiency of operation, and reliability at the critical time of utility failure. It would also be desirable to provide such a system without adding excessive costs or space requirements.

BRIEF SUMMARY OF THE INVENTION

The present invention overcomes the problems of the prior art by providing a hybrid rotary-static UPS system having a shaft coupled AC main drive motor and an AC main generator comprising a motor generator set, and an AC induction motor coupled with or on the same shaft of the motor generator set. The main motor is powered by AC current from the utility when utility power is available. As the induction motor is rotated by its mechanical coupling with the motor generator set, the induction motor is continuously energized by an inverter, the inverter supplying an output current to the induction motor windings at a frequency below utility line frequency. Since the inverter frequency is below the utility line frequency, the induction motor functions as an induction generator and its generated output voltage supplies power to the inverter which acts as a rectifier to charge a battery or bank of batteries during normal utility powered operation. Generated voltage from the induction motor can be closely controlled by varying the excitation frequency of the inverter slightly.

When the utility fails, the rotational speed of the main drive motor begins to drop and the AC induction motor assumes the load with no start-up transients or large stresses. When an outage is detected, the main drive motor can be disconnected to prevent backfeeding of power to the utility. The inverter supplies AC current to the induction motor, using the battery as a DC current source. Upon detection of utility failure with appropriate detection techniques, the inverter output frequency may be increased slightly to bring the rotational speed of the induction motor shaft up to its standard operating speed under utility power. This simultaneous action will keep the main motor generator's mechanical load output frequency substantially constant.

The hybrid rotary-static UPS system provides a number of advantages over prior art UPS systems.

A primary advantage of the present invention is the total isolation of the inverter and battery from the utility, which provides protection from line transients. There is no electrical connection between the inverter and any component except the battery and the AC induction motor, with the exception of low power control connections. The battery, inverter, and AC induction motor therefore form an isolated subsystem of the hybrid rotary-static UPS system. Variations in utility input will be isolated from the battery, inverter, and AC induction motor. No line harmonics or noise will affect operation of the inverter of the hybrid rotary-static UPS system.

Further advantages to the present invention include the elimination of many additional components needed by other systems including a battery switch, input rectifiers, contactors, utility circuit breakers, fuses, and a battery charger. The inverter used in the present invention may be downsized from the inverter size required by many other comparable UPS systems. Since the inverter does not run directly off utility power, no harmonics are generated back into the line. Reliability of the UPS system is increased since the inverter will not need to handle large transient currents at or during switchover to battery power.

Since the inverter operates continuously, although at a frequency below line frequency, most stresses associated with off-line systems are eliminated. Frequency response is much quicker than a DC motor response, allowing little or no disturbance to rotational speed upon utility failure. The battery size may be chosen without regard to the utility voltage or frequency due to its isolation from the utility.

No transformer is needed to step down voltage from the utility to charge the battery. Because the induction motor runs the inverter, a transformer is not necessary. The battery is not affected by utility input. The battery is affected only by rotation of the shaft, not the utility input. Upon utility restart after an outage the isolated subsection of the UPS system will not interfere with synchronization of rotation with the utility frequency or need to deal with any current surge or transients.

Additionally, the AC induction motor may be used as a pony motor to assist in startup of the main motor generator set. A synchronized relay can sense when the main motor voltage is in phase with the line either on startup or return of failed utility power. This allows the current surges and starting transients to be kept very low or even eliminated, reducing stress to the system.

The AC induction motor used with the invention may be undersized, saving in weight and cost, since it is only needed intermittently and for short periods of time. Accordingly, the smaller induction motor may be run at a higher than usual temperature for those short periods without harm.

Continuous non-driving energization of the smaller AC induction motor at a frequency below the line frequency allows the smaller induction motor to be operated as an induction generator by reversing power flow through the inverter, which converts AC current from the induction motor to DC current useable to charge the batteries. Since the induction motor and inverter are operated at a low power level, the efficiency of the hybrid rotary-static UPS system will be higher than that of a pure on-line system. Positioning the smaller AC induction motor on the shaft allows the smaller induction motor to idle in a non-driving condition during normal utility powered operation, but since the shaft is rotating, the induction motor does function as an induction generator. The generated power from the AC induction motor is converted by the inverter to DC current which is used to charge the batteries. This use of the smaller induction motor as a substitution for a battery charger eliminates the need for a separate battery charger, which if needed would eliminate the isolation the inverter now has from the line.

When the utility fails, the inverter draws DC current from the battery and converts it to AC current to power the smaller induction motor. Appropriate control systems monitor the utility, and can disconnect the main motor when the utility fails. The control systems can also simultaneously initiate increase of the frequency of the inverter to draw power from the battery instead of to charge the battery.

The size of the smaller induction AC motor is chosen depending upon the needs of the user for a specific time period of backup power. For normal expected backup time requirements, the smaller induction motor may be sized approximately half the size of the main motor in terms of weight. The smaller AC induction motor may be mounted coaxially with the main motor shaft. This configuration saves weight, cost, and space.

These and other objects and benefits of the present invention will become apparent from the following detailed description thereof taken in conjunction with the accompanying drawing.

DESCRIPTION OF THE PREFERRED EMBODIMENT

Figure 1:
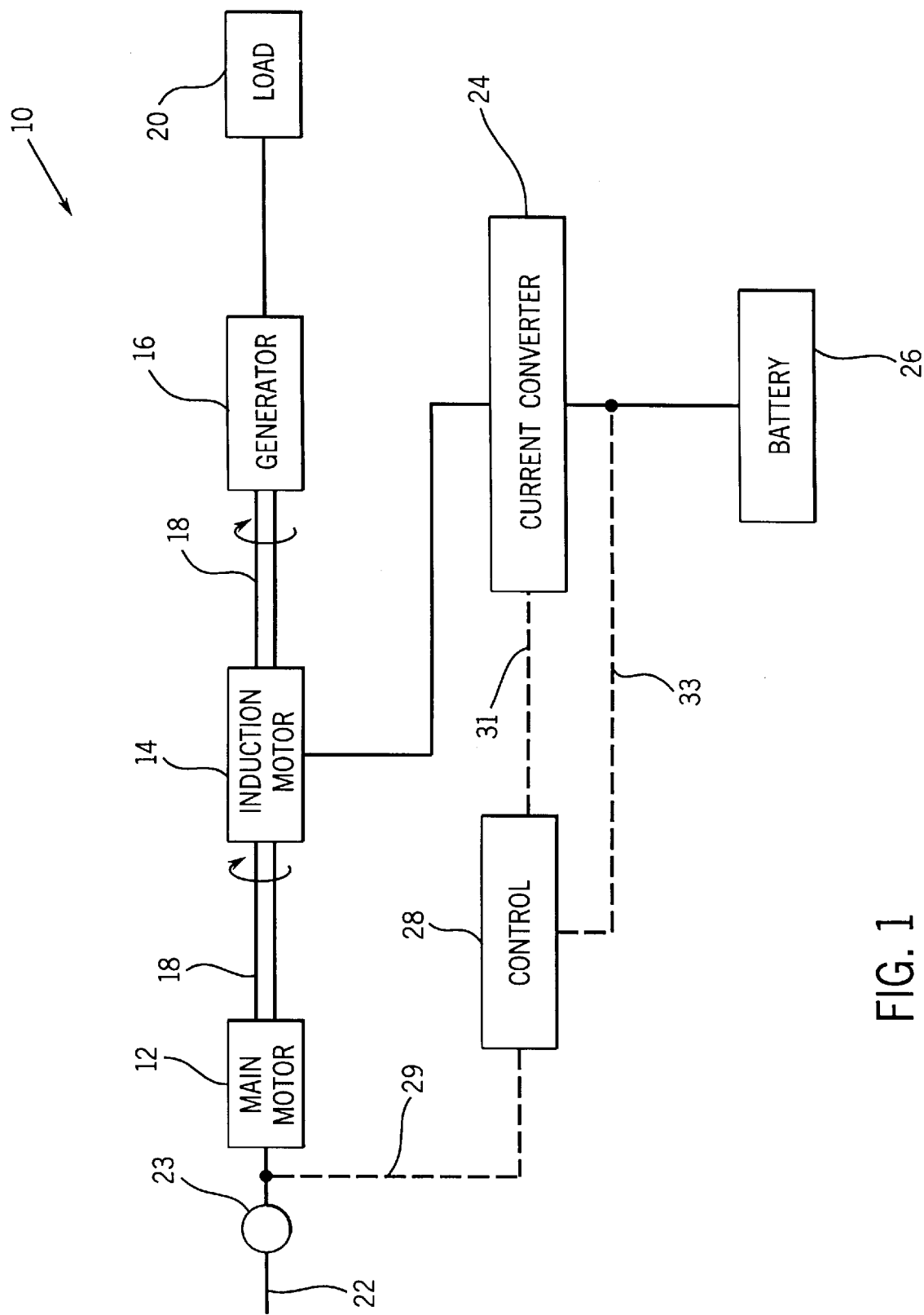
FIG. 1 is a block diagram of an embodiment of the present invention.

Referring now to the drawing, the hybrid rotary-static UPS system 10 may be seen in a block diagram. In UPS system 10, main AC motor 12, AC induction motor 14, and a mechanical load such as generator 16 are shown coupled coaxially by driveshaft 18 to drive load 20. Electric power from a utility is delivered along utility line 22 and powers main motor 12 with alternating current when utility power is available. The terms utility, line, and utility line will be used throughout the specification as interchangeable terms and refer to the standard AC current normally delivered by a commercial power generating company. Main motor 12 may be an AC induction motor, although it is preferably a synchronous AC motor. Appropriate starting means such as a motor starter 23 may be situated at the input end of main motor 12 for normal startup of the UPS system 10. Such motor starters 23 are known in the art and will not be discussed further herein.

Main motor 12, induction motor 14, and the mechanical load are preferably mechanically coupled together. The mechanical load is preferably a generator 16. Other mechanical loads may be substituted. Such other mechanical loads include compressors, pumps, fans, conveyors, hydraulic motors, and the like. The coupling is preferably accomplished so that the main motor 12, induction motor 14, and mechanical load are coaxially coupled. This arrangement of the coupling is the most efficient and least complex configuration for coupling the components. However, other couplings and linkages could be employed. In situations in which space is limited, coupling could be accomplished with other mechanical linkages to allow the components to be non-coaxially coupled. Such other coupling configurations are known in the art and will not be discussed further herein.

AC induction motor 14 may be undersized and substantially smaller than main motor 12 since it is only needed intermittently, and for short periods. Accordingly, the size of induction motor 14 may often be about half the size of main motor 12 and can be allowed to run at a higher temperature for those short periods of time without harm to the induction motor 14. Further, since the operation need only be intermittent, the induction motor 14 may be run at higher frequency as needed to match the line frequency of the utility 22 for those short periods. The size of induction motor 14 will depend upon the needs of the user.

Induction motor 14 is operatively electrically connected to current converter (inverter 24) which is in turn electrically connected to battery 26. Inverter 24 may be six-step or pulse width modulated. Battery 26 may be a single battery or a bank of batteries. Induction motor 14 is powered continuously by the inverter 24 at a frequency slightly below the line frequency of utility 22. Since the frequency of the inverter 24 is lower than that of the utility power, induction motor 14 operates as an induction generator during normal utility powered operation, reversing power flow through the inverter, with the inverter acting as a rectifier to convert AC current generated by the induction motor 14 to DC current to charge battery 26 at a low charge rate.

A circuit breaker may be positioned between inverter 24 and induction motor 14 for protection against overcurrent, or to disconnect for maintenance. Additionally, a fused switch may be placed between battery 26 and inverter 24 for the same purpose.

An appropriate control mechanism 28 is electronically connected with utility power by line 29 to sense the magnitude and frequency characteristics of the utility power and serves to control the frequency output of the inverter 24 through control line 31 to allow for small variations in the line frequency from utility 22. Similarly, control mechanism 28 may be used to control the charging current from inverter 24 to battery 26 so that battery 26 may be kept properly charged. Control mechanism 28 is connected through line 33 to the battery charging line from the inverter 24 to monitor the electrical characteristics of the charging current to battery 26.

Control mechanism 28 may also be used to detect variations in power or failure of utility 22. There are a number of ways that this detection may be accomplished. Detection of reverse power to the utility 22 is one method. Upon detection of such a power reversal, or detection of zero power flowing to the main motor 12, control mechanism 28 can initiate operation of UPS system 10 by increasing the operating frequency of the inverter 24 so as to allow the inverter to drive induction motor 14, and disconnecting main motor 12 from the line to prevent back-feeding the utility. Standard controls for the motors 12 and 14 and generator 16 may also be operated by control mechanism 28. Such controls are well known and will not be described further herein.

In operation, hybrid rotary-static UPS system 10 works as follows. Main motor 12 is normally run from power supplied by utility 22. Induction motor 14 is continuously energized by inverter 24 at a frequency slightly below that of the frequency of the utility 22. Induction motor 14, being coupled to the same shaft 18 as motor 12, is supplied with rotational power by rotation of shaft 18. Induction motor 14 essentially idles during operation of motor 12 by utility 22.

The output frequency of inverter 24 to induction motor 14 is maintained slightly lower than the frequency of electrical power of utility 22, and therefore induction motor 14 operates as an induction generator by reversing power flow through the inverter which functions as a rectifier, converting AC current generated by the induction motor to DC current useable to charge battery 26 at a low power level.

Upon failure of the utility 22, the rotational speed of shaft 18 drops, causing AC induction motor 14, which is operating at a lower frequency than the utility line frequency, to begin functioning as a motor to rotate to shaft 18. When an outage of utility 22 is detected by control mechanism 28 or other appropriate detection systems, the main motor 12 can be disconnected in order to prevent backfeeding of power into the utility 22, and the battery 26 will supply power through inverter 24 to AC induction motor 14. The frequency of inverter 24 can then be automatically and simultaneously increased by control mechanism 28 to bring the rotational speed of the shaft 18 back to the rotational speed provided by nominal utility line frequency. Since induction motors have some inherent slip, the frequency of inverter 24 is increased to a frequency slightly greater than that supplied by utility 22, so that the rotational speed of shaft 18 is maintained nearly constant. Alternatively, the frequency of inverter 24 may be adjusted manually, or the inverter 24 may be run at the lower frequency. Preferably, control mechanism 28 adjusts the frequency of inverter 24 nearly instantaneously upon failure of utility power, resulting in little or no disturbance to rotational speed of shaft 18. When utility 22 fails, UPS system 10 is operated so that battery 26 powers inverter 24 and through it induction motor 14.

When utility power returns, a synchronizing relay controlled by control mechanism 28 senses when the voltage of main motor 12 is in phase with that of utility line voltage, and allows motor 12 to be connected to the utility 22 in phase without a current surge. At this time, when power is switched back from powered operation by battery 26 to powered operation by utility 22, the frequency of the inverter 24 will be adjusted down so that induction motor 14 will once again function as an induction generator to charge battery 26 through inverter 24.

When the main motor 12 and generator 16 of the motor generator set are being started, induction motor 14 can be used as a pony motor for the purposes of bringing the rotational speed of the main shaft 18 of motor 12 near to its normal rotational operating speed to keep starting transients very low. The synchronizing relay discussed above will sense when the voltage of the main motor 12 is in phase with line 22, and then will allow motor 12 to be connected to line 22 in phase.

Aside from very low power control and sensing connections 31 and 33, the induction motor 14, inverter 24 and battery 26 are electrically isolated from the utility. Accordingly, the battery 26, inverter 24, and induction motor 14 form a subsystem isolated from the problems of the utility and which will function predictably without regard to the conditions of the load 20 or the utility 22.

The isolation of the induction motor 14, inverter 24, and battery 26 from the utility eliminates the need for transformers which traditionally isolate the battery charging circuits from the utility power and allows the battery 26 to be chosen regardless of the line voltage. In a system in which an inverter is run directly from the utility, and a motor is run from the inverter, a transformer is required to reduce the utility voltage to avoid having to run the inverter at a very high voltage. High voltage inverters are expensive and require expensive technology. Further, they are less reliable than lower voltage inverters. The use of induction motor 14 and inverter 24 as a battery charger eliminate the need for the battery transformer. The battery 26 is unaffected by the utility 22, and is affected only by rotation of shaft 18.

By holding the inverter 24 continuously active, but idling at a frequency lower than the frequency of the utility 22, so as to idle induction motor 14 on shaft 18, the user will become immediately aware of any failure of induction motor 14 or inverter 24, and will be able to attend to repair of either as necessary. Further, by holding the inverter 24 active, the stress associated with inverter startup is greatly reduced.

The control mechanism 28 is used to regulate the charging rate to the battery 26 as battery 26 is being charged through inverter 24 by the induction generator function of induction motor 14. Control system 28 does not need to include components which will sense the failure of the utility 22. However, without such a sensing of a failure of utility 22, the inverter 24 will remain at a lower frequency than the line unless adjusted manually. The idling induction motor 14 provides a redundant backup for hybrid rotary-static UPS system 10. If the control mechanism 28 fails to detect a failure of utility 22, or fails to increase the speed of the induction motor 14 through inverter 24, the UPS system 10 will still provide uninterrupted power to the load 20, but at a reduced frequency. In such a case, the frequency of inverter 24 may be manually adjusted by the user.

Although an inverter 24 is preferred, other current conversion means known in the art may be substituted without departing from the scope of the invention. Such other current conversion means are generally more complex and more subject to failure than the inverter 24.

Although the induction motor 14 is preferably undersized for typical backup system time requirements, the size of induction motor 14 is chosen depending upon the needs of the user. Accordingly, if the user desires a longer than normal period of backup for an outage of utility 22, induction motor 14 will be appropriately sized to provide backup power after failure of utility 22 for the predetermined amount of time. For example, if a user desires 15 minutes of backup, the induction motor 14 would be sized to not overheat or to survive being overheated for a period of fifteen minutes. Similarly, if the user desires an hour of backup after utility failure, the induction motor 14 would be sized to not overheat or to survive being overheated for one hour. For typical backup power periods desired, the induction motor 14 may be approximately half the size of main motor 12 in terms of weight.

The detailed description outlined above is considered to be illustrative only of the. principles of the invention. Numerous changes and modifications will occur to those skilled in the art, and there is no intention to restrict the scope of the invention to the detailed description. The preferred embodiments of the invention having been described in detail, the scope of the invention should be defined by the following claims.

What is claimed:

1. An uninterruptable power supply for normal operation under power supplied by a utility, and without interruption upon failure of the utility, comprising:

a main motor connectable to the utility;

an AC induction motor capable of generating an output current as an induction generator;

a mechanical load;

said main motor, said AC induction motor, and said mechanical load mechanically coupled together for rotation;

battery means to supply DC current;

current conversion means operatively electrically connected between said AC induction motor and said battery means to receive said output current from said AC induction motor and convert said output current to direct current so as to charge said battery means during normal operation, and to receive said DC current from said battery means and convert said battery current to AC motor driving current of a predetermined frequency to power said induction motor during a failure of the utility.

2. The uninterruptable power supply of claim 1, wherein said main motor is a synchronous motor.

3. The uninterruptable power supply of claim 1, wherein said main motor, said AC induction motor, and said mechanical load are coaxially coupled.

4. The uninterruptable power supply of claim 1, wherein said induction motor is smaller than said main motor.

5. The uninterruptable power supply of claim 1, wherein said induction motor is approximately half the size of said main motor.

6. The uninterruptable power supply of claim 1, where said current conversion means is an inverter capable of converting DC current to AC motor driving current and converting said output current to direct current.

7. The uninterruptable power supply of claim 1, and further comprising control means operatively connectable to the utility power supply to detect utility failure and to increase said frequency of said motor driving current from said current conversion means upon such a utility failure to cause said battery means to power said induction motor.

8. The uninterruptable power supply of claim 7, and further comprising:

control means operatively electrically connected to said current conversion means to increase said frequency of said current conversion means, to detect utility power failure and to control operation of said AC induction motor, said main motor, and said mechanical load.

9. The uninterruptable power supply of claim 1, and further comprising:

control means operatively electrically connected to said current conversion means to increase said frequency of said current conversion means upon utility failure to cause said battery means to power said induction motor, to detect a utility power failure, and to control operation of said AC induction motor, said main motor, and said mechanical load.

10. The uninterruptable power supply of claim 9, wherein said induction motor is approximately half the size of said main motor.

11. The uninterruptable power supply of claim 1, wherein said mechanical load is a generator.

12. A method of providing uninterruptable electric power to a load driven by a main motor using power from a utility at normal utility line frequency in normal operation, an induction motor and a mechanical load mechanically coupled together with said main motor, and current conversion means electrically connected between the induction motor and a battery to deliver current therebetween, comprising:

operating the main motor under utility power when utility power is available;

energizing the induction motor through the current conversion means at a frequency slightly below line frequency when utility power is available; charging the battery through the current conversion means by using the induction motor as an induction generator when utility power is available; and operating the induction motor under battery power through the current conversion means during failure of the utility power to operatively engage the mechanical load.

13. The method of providing uninterruptable power to a load as described in claim 12, and further comprising:

detecting when utility power has failed and in response thereto switching off utility power to the main motor once operation of the utility power has switched to battery power.

14. The method of providing uninterruptable power to a load as described in claim 12, and further comprising:

detecting that power from the utility has become available after utility failure;

synchronizing the frequency of the induction motor to the main motor;

connecting the main motor to utility power when frequency synchronization is present between main motor and induction motor; and using the induction motor to charge the battery through the current conversion means.

15. The method of providing uninterruptable power to a load as described in claim 12, and further comprising:

increasing the frequency of the current from the conversion means to the induction motor to operate the mechanical load at normal utility line frequency upon failure of the utility.

16. The method of providing uninterruptable power to a load as described in claim 14, and further comprising:

reducing the frequency of current from the current conversion means to the induction motor so that the induction motor functions as an induction generator.

17. An uninterruptable power supply for normal operation under power supplied by a utility, and without interruption upon failure of the utility, comprising:

a main motor connectable to the utility;

an AC induction motor capable of generating an output current as an induction generator;

a mechanical load;

said main motor, said AC induction motor, and said mechanical load being mechanically coupled together for rotation, the AC induction motor being operatively positioned therebetween said main motor and said mechanical load;

battery means to supply DC current;

current conversion means operatively electrically connected between said AC induction motor and said battery means to receive said output current from said AC induction motor and convert said output current to direct current so as to charge said battery means during normal operation when said AC induction motor is rotated by said main motor, and to receive said DC current from said battery means and convert said battery current to AC motor driving current of a predetermined frequency to power said induction motor during a failure of the utility, the AC induction motor being continuously energized by the current conversion means.

* * * * *